United States Patent [19]

Bayer

[11] Patent Number: 5,755,285
[45] Date of Patent: May 26, 1998

[54] METHOD FOR DECONTAMINATING SOIL CONTAINING HARMFUL SUBSTANCES AND BORING HEAD FOR CARRYING OUT THE METHOD

[75] Inventor: Hans-Joachim Bayer, Ettlingen, Germany

[73] Assignee: FlowTex Technologie-Import von Kabelverlegemaschinen GmbH, Ettlingen, Germany

[21] Appl. No.: 529,247

[22] Filed: Sep. 15, 1995

[51] Int. Cl.$^6$ .................................. E21B 43/16
[52] U.S. Cl. ............................. 166/269; 175/67
[58] Field of Search .................... 166/269, 272, 166/370; 405/128, 263, 264; 175/67

[56] References Cited

U.S. PATENT DOCUMENTS

| | | | |
|---|---|---|---|
| 3,576,222 | 4/1971 | Acheson et al. | 175/67 |
| 3,620,313 | 11/1971 | Elmore et al. | 175/67 X |
| 3,834,461 | 9/1974 | Carlin et al. | |
| 3,881,561 | 5/1975 | Pols et al. | 175/67 X |
| 4,624,326 | 11/1986 | Loegel, Jr. | |
| 4,842,448 | 6/1989 | Koerner et al. | 405/128 X |
| 4,848,460 | 7/1989 | Johnson, Jr. et al. | |
| 4,992,174 | 2/1991 | Caplan et al. | 405/128 X |
| 4,993,503 | 2/1991 | Fischer et al. | |
| 5,011,329 | 4/1991 | Nelson et al. | 405/128 |
| 5,018,576 | 5/1991 | Udell et al. | 166/246 X |
| 5,186,256 | 2/1993 | Downs | |
| 5,263,795 | 11/1993 | Corey et al. | 166/128 |
| 5,265,674 | 11/1993 | Fredrickson et al. | |
| 5,271,693 | 12/1993 | Johnson et al. | 405/128 |
| 5,279,740 | 1/1994 | Basile et al. | 166/246 X |
| 5,346,330 | 9/1994 | Bernhardt | |

FOREIGN PATENT DOCUMENTS

| | | |
|---|---|---|
| 3516572 | 11/1986 | Germany |
| 8804344 | 3/1988 | Germany |
| 390808171 | 9/1990 | Germany |

OTHER PUBLICATIONS

H.-J. Bayer; Principles of the Controllable Horizontal Jet-Drilling Technique, 3R International, vol. 30, No. Sep. 1991 with English Translated Excerpt, p. 7.

*Primary Examiner*—Frank Tsay
*Attorney, Agent, or Firm*—Finnegan, Henderson, Farabow, Garrett & Dunner, L.L.P.

[57] ABSTRACT

The invention relates to a method for decontaminating soil containing harmful substances, wherein a number of bore holes (11) are advanced to the areas at the edge of the area (21) of contaminated soil by means of a course controlled boring method, then under a continuation of the boring a directed injection of at least one appropriate injection medium (8) from the bore holes (11) is carried out such that the harmful substances are forced into a smaller soil area (21) and are finally removed. Furthermore, the invention relates to a boring head for carrying out the method according to the invention. The boring head includes a tubular boring head body with an inner flow passage and a boring head tip connected to the boring head body and having a convex tip surface the head tip has a plurality of openings connected to the inner passage. The head tip further includes a control surface inclined relative to the longitudinal axis of the head tip towards the surface area of the tip so that an injection medium can be injected through the inner passage and out through the plurality of openings.

24 Claims, 4 Drawing Sheets

METHOD FOR DECONTAMINATING SOIL CONTAINING HARMFUL SUBSTANCES AND BORING HEAD FOR CARRYING OUT THE METHOD

BACKGROUND OF THE INVENTION

1. Field of the Invention

The invention relates to a method for decontaminating soil containing harmful substances, wherein a number of bore holes are advanced to the areas at the edge of the area of contaminated soil by means of a course-controlled boring method, and to a boring head for carrying out the method comprising an inner channel, a control surface inclining relative to the longitudinal axis of the boring head towards the boring head tip, and a number of openings being connected to the inner channel and formed within a surface being joined to the control surface.

2. Description of the Related Art

Soil is in many places heavily contaminated with different harmful substances, such as, for example, halogens and aromatic hydrocarbons as well as, for example, acids, cyanides and also heavy metals. To decontaminate this soil, it was until now only possible to excavate the entire area of soil and subject it to an external soil washing. An external soil washing is, however, every expensive and tedious, depending on the volume to be excavated. Furthermore, soil areas which are difficult to access cannot be cleaned by excavation at all.

SUMMARY OF THE INVENTION

The technical problem forming the basis of the invention is to create an effective method for decontaminating soil, by which the contaminant content in the soil can be reduced in a relatively cost-efficient and effective manner.

This technical problem is solved by a method for decontaminating soil containing harmful substances, wherein a number of bore holes are advanced up to the areas at the edge of the area of contaminated soil by means of a course-controlled boring method; then, under a continuation of the boring, a directed injection of at least one appropriate injection medium from the bore holes is carried out such that the harmful substances are forced into a smaller soil area and are finally removed. Furthermore, a boring head with the features according to claim 10 is provided for carrying out the method.

The invention is based on the idea that, by the directed advancement of the bore holes by means of a fully controllable boring method, the bore holes are driven forward and further on toward the contaminated soil area from at least one side—preferably from all sides—, and, by directed injection of an appropriate injection medium—the boring head according to the invention, the harmful substances are isolated from the finest pore spaces and interpore spaces of the contaminated soil area, and are concentrated in a smaller soil area compared to the originally contaminated area. The harmful substances are then removed from the now smaller, highly contaminated soil area.

By means of the advancement of the bore holes and the directed injection of appropriate injection- and soil improving mediums, the soil areas that are contaminated lightly to somewhat lightly are preferably subjected directly to an in-situ soil washing and need not be treated further.

Thus, it is possible for the first time to decontaminate soil layers without extensive excavation work with simultaneous enrichment of the harmful substances in a small predetermined soil area. Although a given number of bore holes are necessary to ensure that the harmful substances migrate to the desired soil area, the costs for the boring and the simultaneous injection of injection mediums are still considerably lower than they are according to the state of the art.

Moreover, also by means of the method according to the invention, such soil layers can be decontaminated for the first time which were not accessible until now because, by means of the fully course-controlled boring method, harmful substances located underneath an occupied area can be driven to areas from which they can then be disposed in a conventional manner.

It is advantageous to remove the collected harmful substances from the smaller, highly contaminated soil area by an extracting device. By this, the excavation work is reduced to a great extent. In particular,—on the basis of the simple construction—at least one suitable pipe or the like with at least one suction pump connected thereto is advantageous as an extracting device.

A very cost efficient and simple way of removing the concentrated harmful substances is to excavate the small, highly contaminated soil area and to dispose or clean it externally, or to dispose of it as special waste. Because the costs for an external soil washing and for the excavation are very high and the deposition as special waste per cubic meter also causes very high costs, a substantial cost reduction is possible at the first time by means of the method according to the invention.

Because of the low costs, the use of water or hot steam, which are injected into the soil under high pressure, as injection mediums has turned out to be very advantageous.

To reduce the surface tension of the injection medium and to achieve a lighter dissolution of the harmful substances from the pore spaces and interpore spaces of the contaminated soil layers, tensides or biotensides, can be added to the injection medium without any problems.

Furthermore, fillers can be injected into the pore space of the subsoil simultaneously with or after the injection of the injection mediums, which prevent renewed or other harmful substances from seeping back, and improve at the same time the condition of the soil and the subsoil in terms of their material.

Depending on the condition of the soil and the type of the harmful substances in the contaminated soil areas, the injection of injection medium under a pressure from 10 to 600 bar has been proven effective.

To support the desired migration, i.e. the migration of the harmful substances in a predetermined direction, it is advantageous to insert one or more heating cables into at least one bore hole. The development of heat is thereby used as support for the migration of the harmful substances.

The heating cable may be formed as heating coil or carbon cable, or such that a radiation of microwaves is made possible, which preferably results in a further, cost-efficient influence on the migration of the harmful substances in the desired direction.

The use of the boring head according to the invention for carrying out the method, which comprises an inner channel, a control surface inclining relative to the longitudinal axis of the boring head towards the boring head tip, and a number of openings being connected to the inner channel and formed within a surface being joined to the control surface, wherein the surface with the openings formed therein is made convex, results in a very effective and precise control of the direction of the migration of the harmful substances.

By the uniform distribution of the openings on the convex surface, a designated soil area can be treated very precisely during the injection of the injection medium, whereby the harmful substances can be isolated from the finest pore spaces and interpore spaces very effectively.

Preferably, the diameter of the openings is 0.1 mm to 0.3 mm, depending on the condition of the soil.

Because the openings are connected to the interior channel through an expander chamber, all openings are fed with the injection medium simultaneously in a very simple, constructive way.

Because the boring head widens towards the convex surface, i.e. towards the boring head tip, and its diameter increases, the convex surface with the openings formed therein is also made larger. Hereby it is possible to arrange a larger number of openings on the convex surface, which, in turn, results in a finer and better injection of the injection medium. At the same time, the control surface is widened in the end region which further improves the ability to control the boring head.

Because the openings are oriented perpendicular to the corresponding tangent plane on the convex surface, the widening formation of the injection stream is achieved.

Advantageously, the injection medium exists fan-shaped through the openings, wherein the outgoing stream being produced in this way encloses an angle range of 30 to 120 degrees, so that the soil area coming into contact with the injection medium is treated up to 3 to 5 m in diameter.

BRIEF DESCRIPTION OF THE DRAWINGS

In the following, an embodiment is described in detail with reference to the enclosed drawings for further explanation and better understanding of the invention.

DESCRIPTION OF THE PREFERRED EMBODIMENTS

Figure 1:
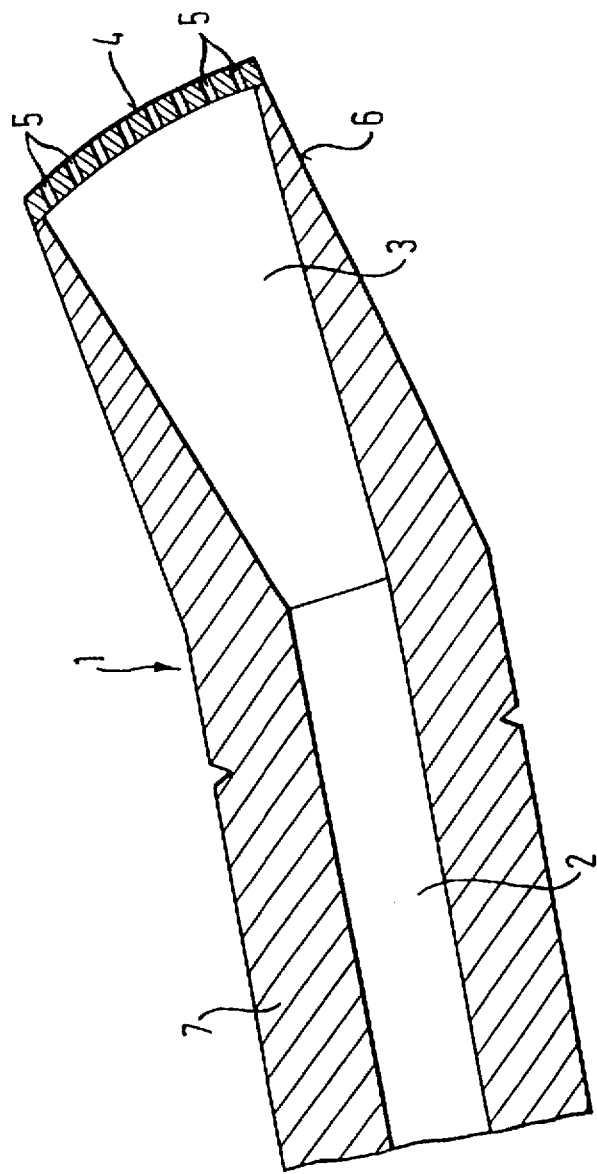
FIG. 1 shows a longitudinal section through a boring head according to the invention with a number of openings at the tip of the boring head.

In FIG. 1, a longitudinal section of a boring head 1 according to the invention is shown, which comprises an essentially cylindrical boring head shaft 7 at the end of the boring head. An even control surface 6 inclines relative to the longitudinal axis of the boring head 1 towards the boring head tip. A slightly convex surface 4 is joined to it within which a number of openings 5 are formed. Inside the boring head 1 an interior channel 2 extends coaxially to the longitudinal axis of the boring head which is supplied with boring suspension and injection medium through the boring rods. An expander chamber 3 is joined to the interior channel 2 which comprises an essentially constant cross-section. The expander chamber 3 extends to the convex surface 4 so that all openings 5 are connected commonly to the interior channel 2 through the expander chamber 3. This longitudinal section shows that the boring head 1 expands towards the boring head tip to arrange as many openings 5 as possible in the convex surface 4. During the discharge of the injection medium, a fine widening stream is thereby produced extending over a large angle range.

Figure 2:
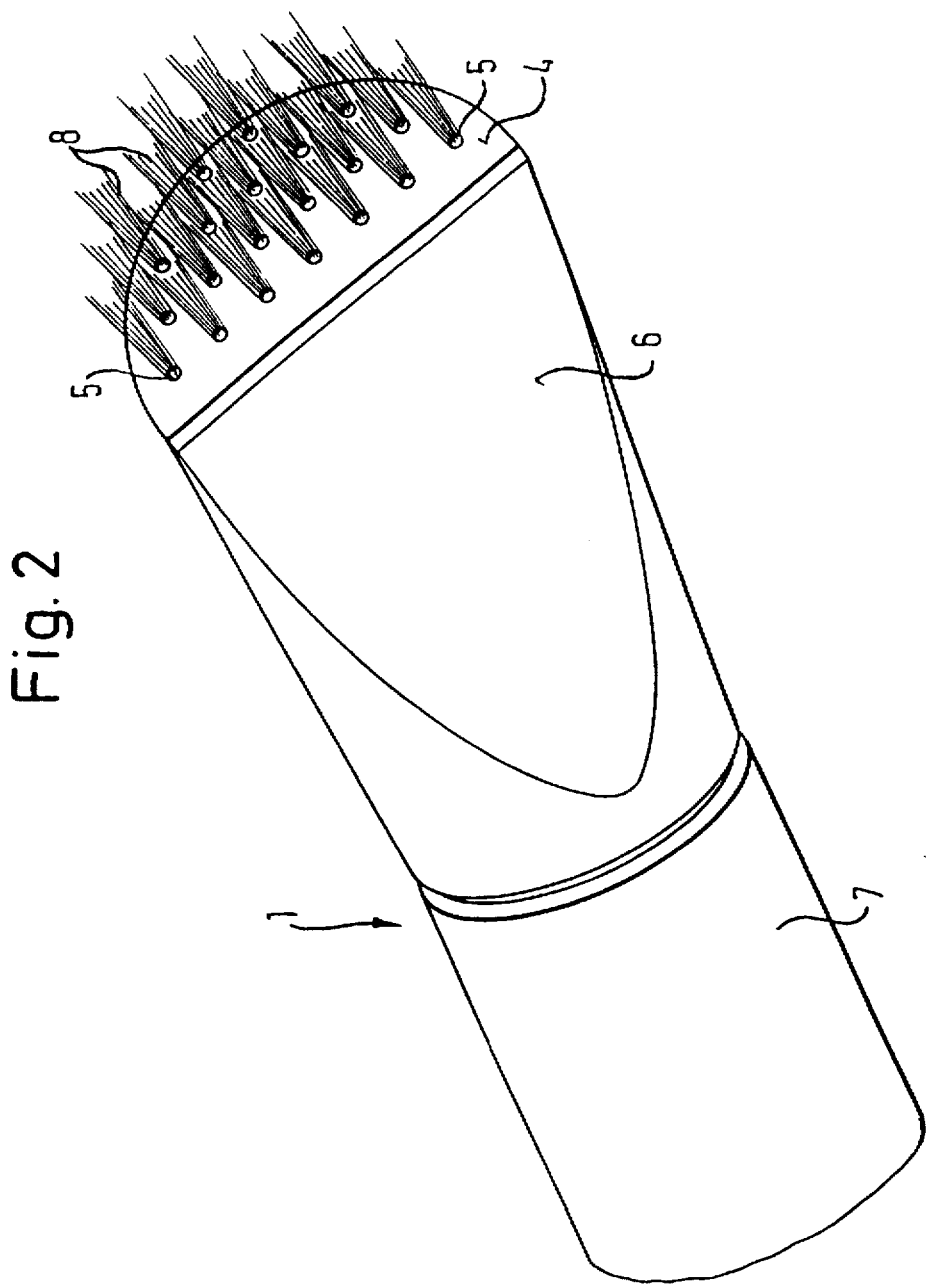
FIG. 2 shows a perspective view of the boring head according to the invention with the widened control surface and outgoing injection medium shown schematically.

FIG. 2 shows a perspective view of the boring head 1 according to the invention. In particular, this view shows again that the boring head slightly widens toward the boring head tip in order to achieve the already mentioned advantages. At the same time, the control surface 6 is also widened relative to a uniformly cylindrical formed boring head, with the result that the boring head has improved control characteristics. FIG. 2 also shows the streaming out of injection medium through the openings 5 in the convex surface 4. The fanning out, finely distributed injection stream 8 is shown here schematically.

Figure 3:
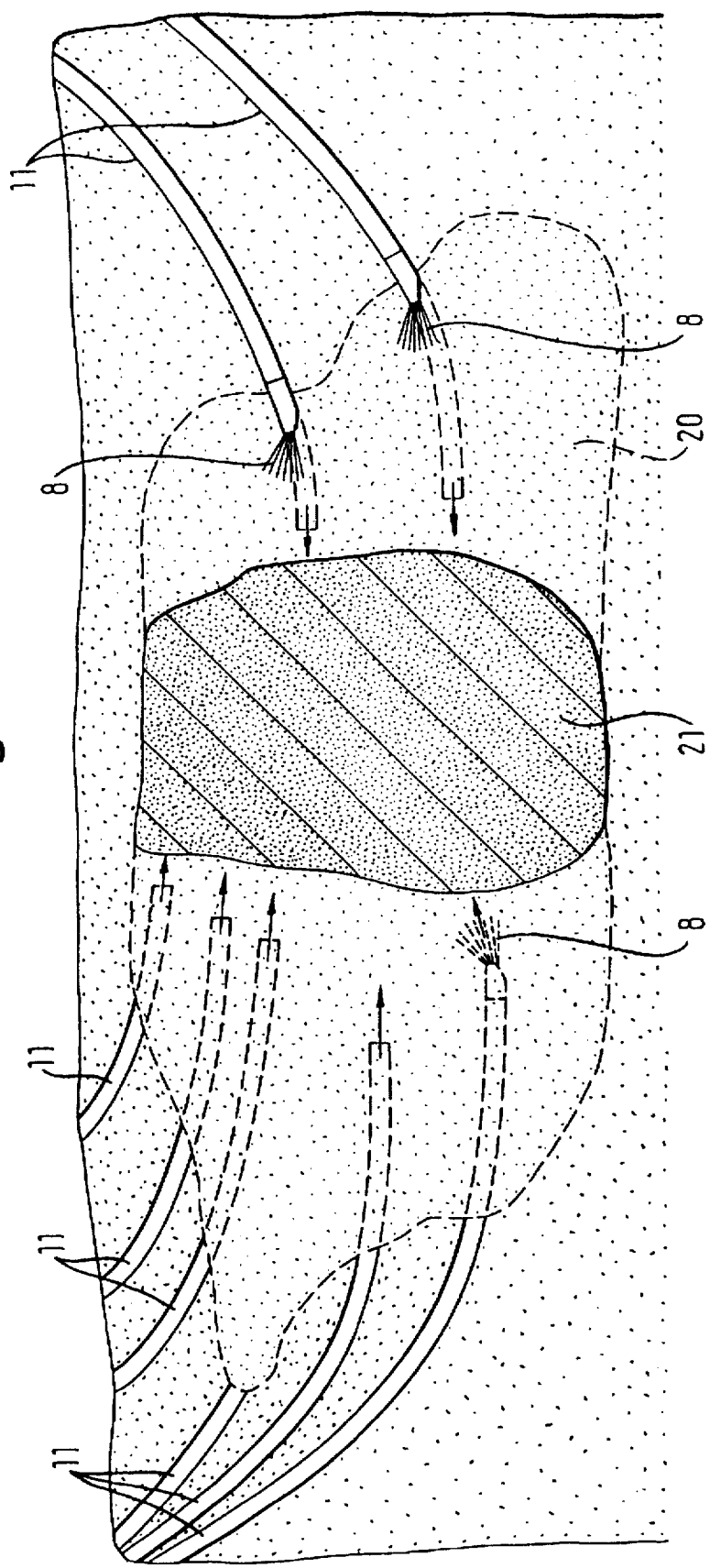
FIG. 3 shows a schematic profile view of a number of bore holes with partly very simplified representation of boring heads, wherein the bore holes are convergently directed towards a small predetermined soil area.
Figure 4:
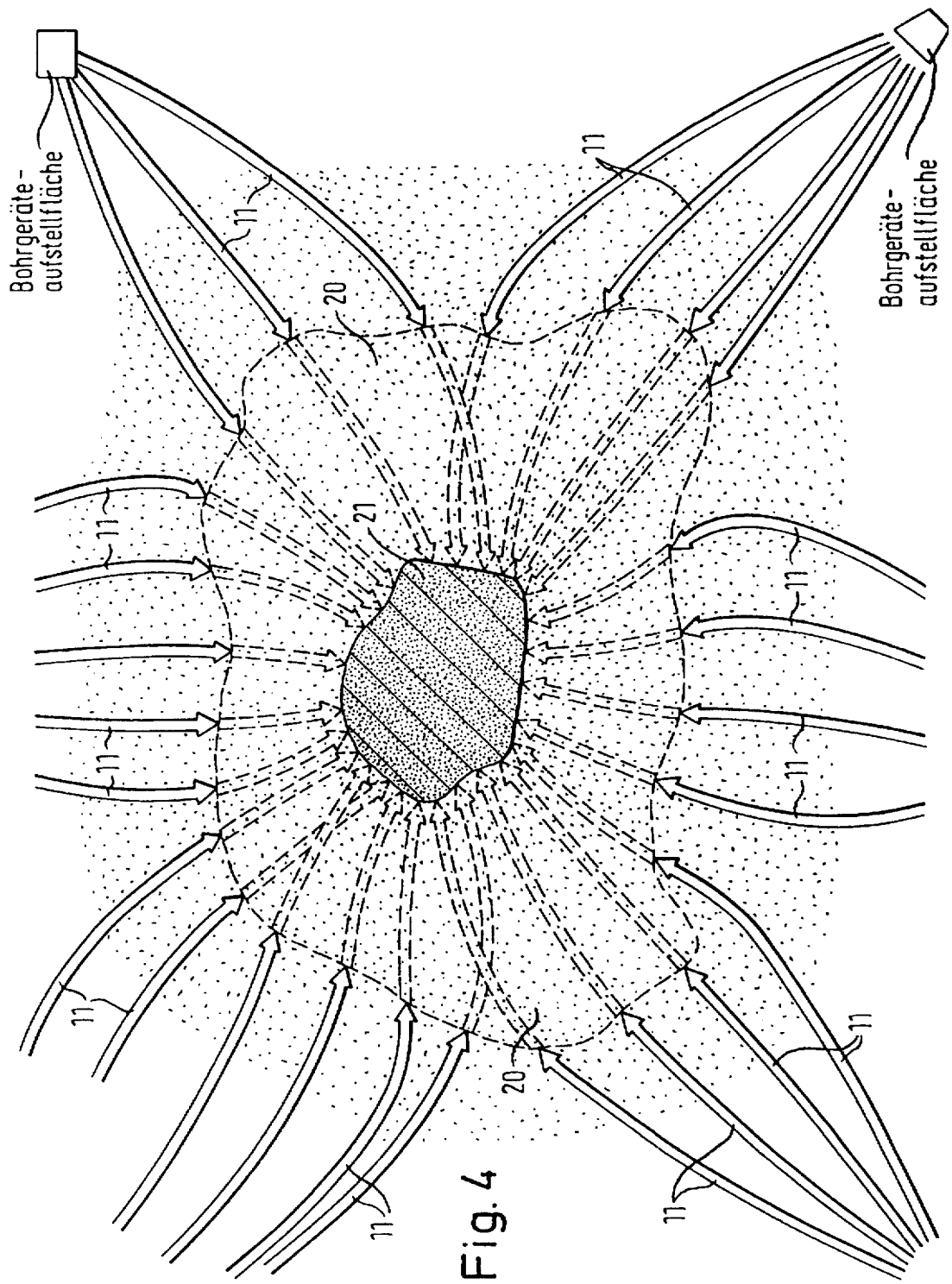
FIG. 4 shows an elevated view of FIG. 3.

A very schematic presentation of the method according to the invention is shown in FIGS. 3 and 4. The method according to the invention is described in the following on the basis of this presentation.

On the basis of historical, geological and geophysical investigations and the like, it will be determined that a large soil area 20 is contaminated with harmful substances. This soil area is shown in FIGS. 3 and 4 by a dotted line. Starting from the surface, fully course-controlled bore holes spaced apart 0.8 to 4 m. are advanced to the areas at the edge of contaminated soil area 20. It is determined in advance in which direction the harmful substances should be forced. This occurs preferably in the direction of soil area 21, which is most contaminated. This means that the harmful substances are forced or washed, from the less contaminated layers 2 in the direction of the more contaminated area 21.

Then, a boring plan is determined which takes the specific geological and geographical facts into consideration. Next, fully course-controlled bore holes 11 are advanced to the area at the edge of area 20 of the less contaminated soil. After injection medium 8 has been injected in the soil through the boring head according to the invention, the harmful substances are washed out from the finest pore spaces and interpore spaces of soil 20 and are pressed in a given direction by the injection medium 8. This direction can be predetermined most precisely by the further injection of injection medium during the boring. By means of the shown number of bore holes 11, a washing out of the harmful substances takes place which then migrate in a given direction.

By means of the method according to the invention, large parts of the soil area 20 having been contaminated earlier are subjected to an in-situ soil washing and do not require further treatment. By producing a migration of the isolated harmful substances in determined directions, a previously determined soil area 21 is enriched with the isolated harmful substances. This soil area 21, being sharply reduced in size and now highly contaminated, is then excavated in a known manner and either subjected to an external soil washing or dumped as special waste. Because the originally contaminated soil area 20 has been reduced by the method according to the invention to the soil area 21 of sharply reduced size, cost savings are possible despite the high number of bore holes 11.

I claim:

1. Method for decontaminating soil containing harmful substances, said method comprising:

locating a contaminated volume of soil containing the harmful substances;

initiating the drilling of a plurality of bore holes outside of the contaminated volume, said bore holes being directed towards the contaminated volume;

advancing the bore holes towards the contaminated volume using a fully controllable boring method; and injecting at least one injection medium into at least one of the plurality of bore holes during the advancing of the bore holes;

wherein the injection medium forces the harmful substances into a smaller volume of soil as compared to the contaminated volume, concentrating the harmful substances into the smaller volume of soil, and decontaminating soil outside the smaller volume of soil.

2. The method for decontaminating soil as claimed in claim 1, further comprising the step of removing the harmful substances from the smaller contaminated soil volume using an extraction device.

3. Method for decontaminating soil as claimed in claim 2, wherein the harmful substances are removed using at least one pipe with at least one suction pump connected thereto.

4. Method for decontaminating soil as claimed in claim 1, further comprising the step of excavating the smaller volume of contaminated soil and disposing of the smaller volume of soil.

5. Method for decontaminating soil according to claim 1, wherein the injection medium comprises water.

6. Method for decontaminating soil as claimed in claim 5, wherein the water contains at least one of tensides and biotensides.

7. Method for decontaminating soil as claimed in claim 1, wherein the injection medium comprises hot steam.

8. Method for decontaminating soil as claimed in claim 7, wherein the hot steam contains, at least one of tensides and biotensides.

9. Method for decontaminating soil as claimed in claim 1, wherein the injection medium contains at least one of tensides and biotensides.

10. Method for decontaminating soil as claimed in claim 1, 2, 3, 4, 5, 7, 9, 6, or 8, wherein the injection medium is injected under a pressure of 10 to 600 bar.

11. Method for decontaminating soil as claimed in claim 1, wherein a heating cable is inserted into at least one bore hole.

12. Method for decontaminating soil as claimed in claim 11 wherein the heating cable is a heating coil.

13. Method for decontaminating soil as claimed in claim 11, wherein the heating cable is a carbon cable.

14. Method for decontaminating soil as claimed in claim 11, wherein microwaves are radiatable from the heating cable.

15. A steerable boring head for use in decontaminating soil, said boring head comprising:

a tubular boring head body, with a first body end and a second body end, said head body having an inner flow passage; and a boring head tip with a first tip end and a second tip end, the first tip end being connected to the second body end, the second tip end having a convex tip surface area and a plurality of openings connected to the inner flow passage, said head tip having a control surface and an expander chamber positioned between the inner flow passage and the plurality of openings, said control surface being substantially planar and being inclined relative to a longitudinal axis of the boring head towards the tip surface area and said expander chamber having a longitudinal axis inclined relative to the longitudinal axis of the boring head to direct the flow of an injection medium from the inner flow passage and out through the plurality of openings.

16. A boring head as claimed in claim 15, wherein said plurality of openings are evenly distributed about the tip surface.

17. A boring head as claimed in claim 15 or 16, wherein each of the plurality of openings have a diameter of 0.1 mm to 2.5 mm.

18. A boring head as claimed in claim 17, wherein each of the plurality of openings is positioned such that the center axis line of each opening is perpendicular to a plane tangent to the tip surface at the center axis line.

19. A boring head as claimed in claim 17, wherein the injection medium injected out through the plurality of openings has a divergent cross-sectional area when intersected by a plane perpendicular to the control surface, the angle of divergence of the cross-sectional area being between 30 and 120 degrees.

20. A boring head as claimed in claim 16, wherein each of the plurality of openings is positioned such that the center axis line of each opening is perpendicular to a plane tangent to the tip surface at the center axis line.

21. A boring head as claimed in claim 15, wherein each of the plurality of openings is positioned such that the center axis line of each opening is perpendicular to a plane tangent to the tip surface at the center axis line.

22. A boring head as claimed in claim 15, wherein the cross-sectional area of the second tip end is greater than the cross-sectional area of the first tip end.

23. A boring head as claimed in claim 22, wherein each of the plurality of openings is positioned such that the center axis line of each opening is perpendicular to a plane tangent to the tip surface at the center axis line.

24. A boring head as claimed in claims 15, 16, 18 or 20, 21, 22, 23 wherein the injection medium injected out through the plurality of openings has a divergent cross-sectional area when intersected by a plane perpendicular to the control surface, the angle of divergence of the cross-sectional area being between 30 and 120 degrees.

* * * * *